United States Patent [19]
Parsons

[11] Patent Number: 5,304,300
[45] Date of Patent: Apr. 19, 1994

[54] RV WATER FILTER APPARATUS

[76] Inventor: Charles F. Parsons, 1120 Audrey Way, Roseville, Calif. 95661

[21] Appl. No.: 929,128

[22] Filed: Aug. 13, 1992

[51] Int. Cl.⁵ .................. B01D 35/02; B01D 27/08; B01D 35/30
[52] U.S. Cl. .................. 210/86; 210/91; 210/232; 210/236; 210/238; 210/241; 210/249; 210/282; 210/440; 210/444; 55/493; 55/508
[58] Field of Search .............. 210/232, 236, 238, 241, 210/249, 282, 86, 87, 91, 440, 444; 55/493, 508

[56] References Cited

U.S. PATENT DOCUMENTS

| | | | |
|---|---|---|---|
| 2,277,737 | 3/1942 | Wilkinson | 210/249 |
| 4,013,562 | 3/1977 | Gott | 210/232 |
| 4,257,888 | 3/1981 | Kudryavtsev | 210/236 |
| 4,416,775 | 11/1983 | Halbich | 210/236 |
| 4,626,346 | 12/1986 | Hall | 210/137 |
| 4,626,350 | 12/1986 | Reid | 210/282 |
| 4,654,142 | 3/1987 | Thomsen | 210/249 |
| 4,683,054 | 7/1987 | Turnbull | 210/282 |
| 4,698,164 | 11/1987 | Ellis | 210/282 |
| 4,713,175 | 12/1987 | Bray | 210/282 |
| 4,877,521 | 10/1989 | Petrucci | 210/282 |
| 4,882,061 | 11/1989 | Petrucci | 210/257.2 |
| 4,897,187 | 1/1990 | Rice | 210/282 |
| 4,904,382 | 2/1990 | Thomsen | 210/238 |
| 4,948,505 | 8/1990 | Petrucci | 210/282 |
| 5,004,535 | 4/1991 | Bosko | 210/259 |
| 5,022,986 | 6/1991 | Lang | 210/249 |
| 5,037,547 | 8/1991 | Burrows | 210/282 |
| 5,084,172 | 1/1992 | Yee | 210/249 |
| 5,114,572 | 5/1992 | Hunter | 210/282 |
| 5,154,823 | 10/1992 | Ma | 210/282 |
| 5,221,473 | 6/1993 | Burrows | 210/282 |

Primary Examiner—Thomas M. Lithgow
Attorney, Agent, or Firm—Leon Gilden

[57] ABSTRACT

As filter canisters are utilized by recreational vehicles, provision of a single filter canister to the primary water input line exteriorly of the vehicle is provided. The recreational vehicle includes a filter canister mounted exteriorly of the recreational vehicle exteriorly adjacency to the vehicle's fill nozzles, wherein a first fluid supply conduit is directed to the filter canister and in turn mounts a second fluid supply conduit directed into the fill nozzle of the vehicle to effect filtering of the primary water supply of the vehicle. A flange plate is slidably received within a mounting flange for selective positioning and mounting of the canister during use permitting ease of disassembly of the canister relative to the recreational vehicle for ease of transport of the vehicle.

2 Claims, 5 Drawing Sheets

RV WATER FILTER APPARATUS

BACKGROUND OF THE INVENTION

1. Field of the Invention

The field of invention relates to water filter apparatus, and more particularly pertains to a new and improved RV water filter apparatus wherein the same is arranged for ease of securement and positioning of a water filter canister relative to a recreational vehicle as it may be utilized by various recreational vehicles as original or retrofit structure. Filter canisters are often added to recreational vehicles by mounting them on an interior wall and inserting them in a hot or cold water line beneath a water outlet. In order to serve all lines in the RV, at least four canisters are needed. This apparatus filters water as it enters the vehicle and elinates the need for multiple canisters.

2. Description of the Prior Art

Water filter apparatus of various types are utilized in the prior art and such is exemplified in U.S. Pat. No. 4,882,061.

Further examples of water filter structure are set forth in U.S. Pat. Nos. 4,798,672; 4,895,651; and 4,770,768 utilizing various filtration components such as charcoal and the like.

Accordingly, there remains a need for a new and improved RV water filter apparatus as set forth by the instant invention which addresses both the problems of ease of use as well as effectiveness in construction in providing for a readily mounted and dismounted arrangement for a water filter structure relative to a recreational vehicle and in this respect, the present invention substantially fulfills this need.

SUMMARY OF THE INVENTION

In view of the foregoing disadvantages inherent in the known types of filter apparatus now present in the prior art, the present invention provides a RV water filter apparatus wherein the same is directed to the ease of positioning and placement of a water filter relative to a recreational vehicle. As such, the general purpose of the present invention, which will be described subsequently in greater detail, is to provide a new and improved RV water filter apparatus which has all the advantages of the prior art water filter apparatus and none of the disadvantages.

To attain this, the present invention provides a recreational vehicle including a filter canister mounted to a bottom wall of the recreational vehicle exteriorly thereof in adjacency to the vehicle's fill nozzles, wherein a first fluid supply conduit is directed to the filter canister and in turn mounts a second fluid supply conduit directed into the fill nozzle of the vehicle to effect filtering of the primary water supply of the vehicle. A flange plate is slidably received within a mounting flange for selective positioning and mounting of the canister during use permitting ease of disassembly of the canister relative to the recreational vehicle for ease of transport of the vehicle.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved RV water filter apparatus which has all the advantages of the prior art water filter apparatus and none of the disadvantages.

It is another object of the present invention to provide a new and improved RV water filter apparatus which may be easily and efficiently manufactured and marketed.

It is a further object of the present invention to provide a new and improved RV water filter apparatus which is of a durable and reliable construction.

An even further object of the present invention is to provide a new and improved RV water filter apparatus which is susceptible of a low cost of manufacture with regard to both materials and labor, and which accordingly is then susceptible of low prices of sale to the consuming public, thereby making such RV water filter apparatus economically available to the buying public.

Still yet another object of the present invention is to provide a new and improved RV water filter apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
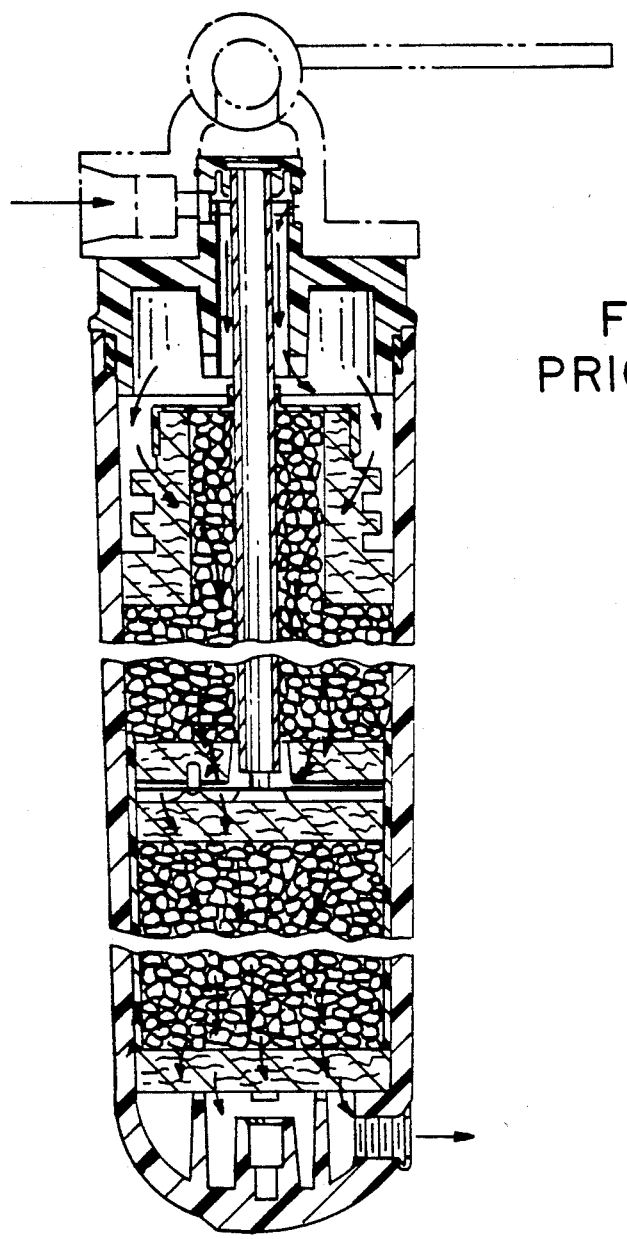
FIG. 1 is an orthographic cross-sectional illustration of a prior art water filter apparatus as indicated in the U.S. Pat. No. 4,882,061.
Figure 2:
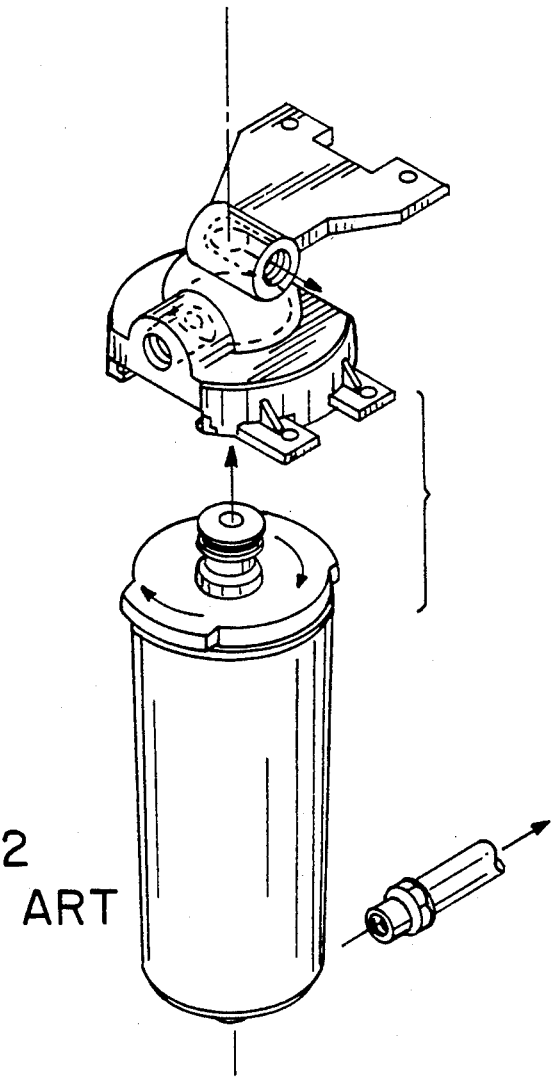
FIG. 2 is an isometric illustration of the water filter apparatus as depicted in FIG. 1.
Figure 3:
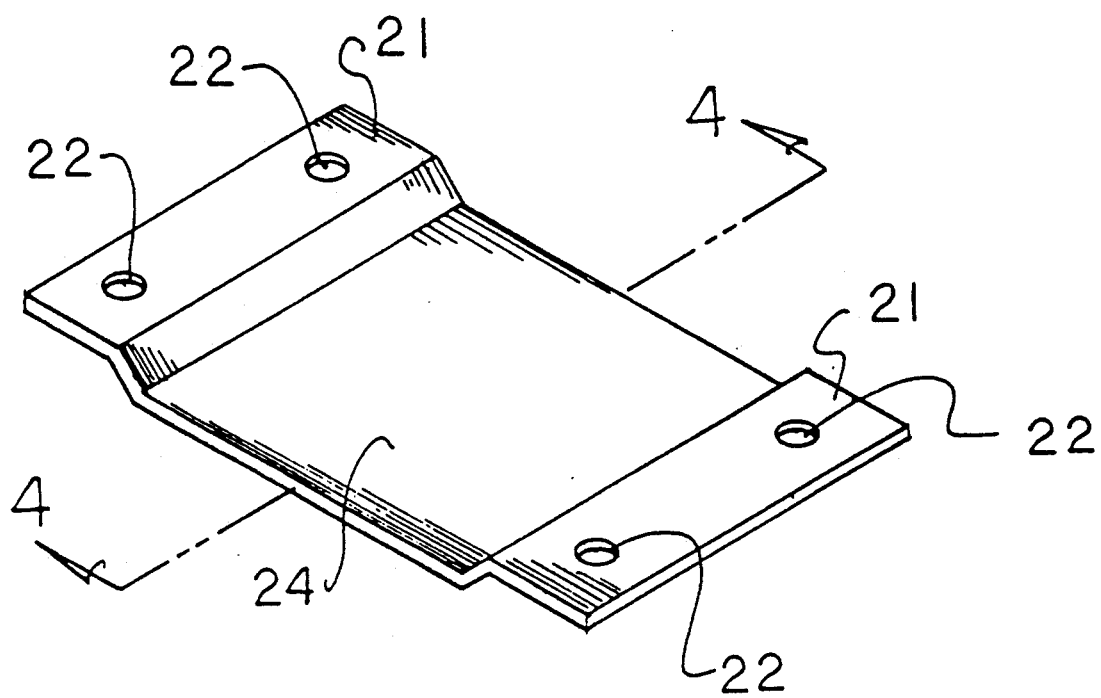
FIG. 3 is an isometric illustration of the mounting flange structure of the instant invention.
Figure 4:
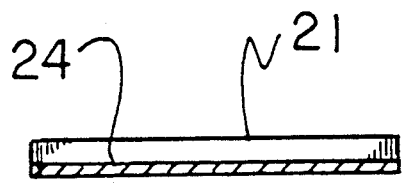
FIG. 4 is an orthographic view, taken along the lines 4—4 of FIG. 3 in the direction indicated by the arrows.
Figure 5:
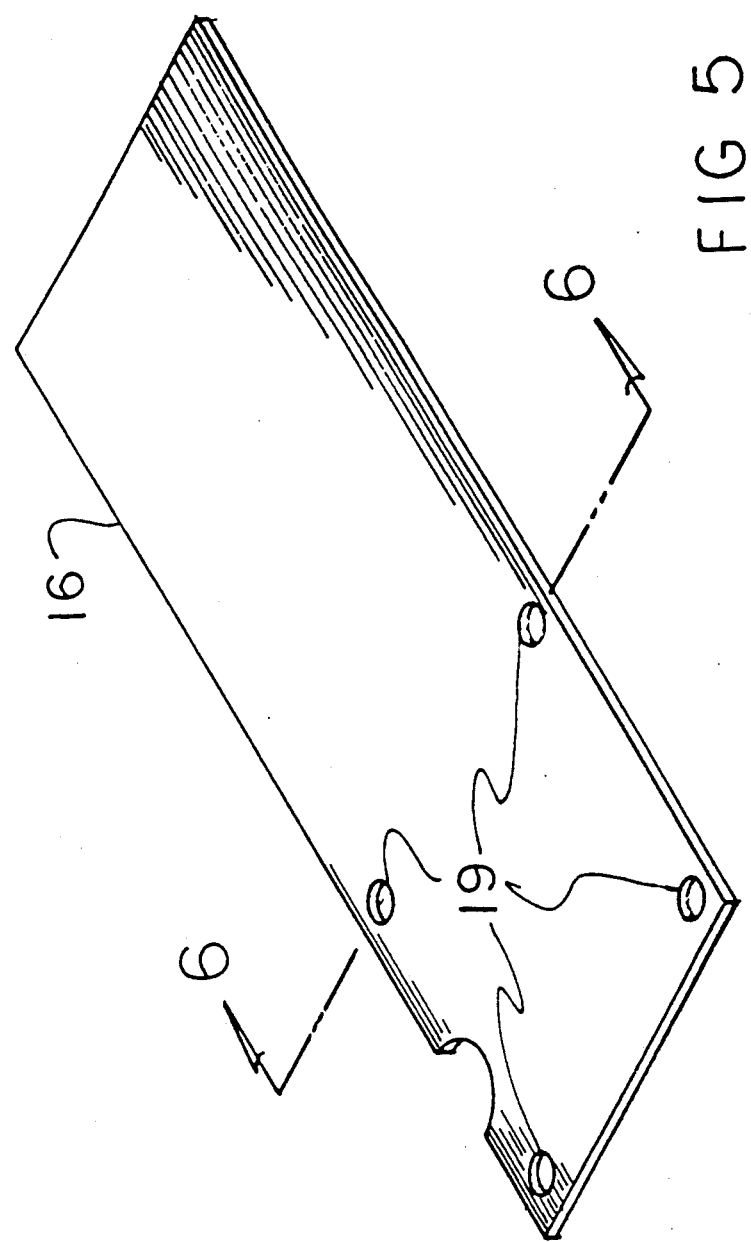
FIG. 5 is an isometric illustration of the flange plate as utilized by the invention.
Figure 6:
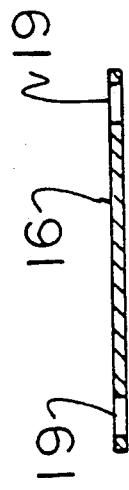
FIG. 6 is an orthographic view, taken along the lines 6—6 of FIG. 5 in the direction indicated by the arrows.
Figure 7:
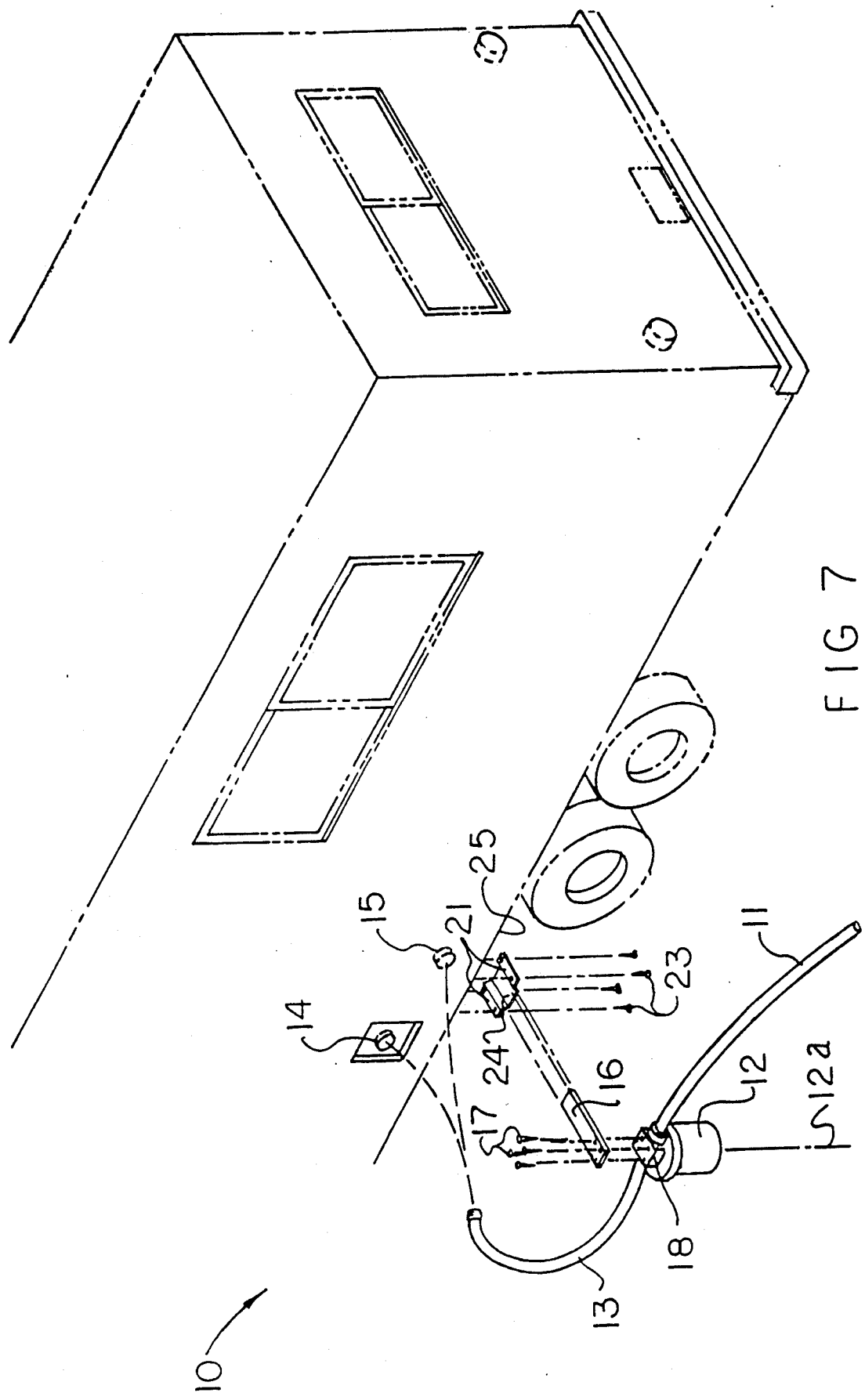
FIG. 7 is an isometric illustration of the invention in an assembled configuration.

With reference now to the drawings, and in particular to FIGS. 1 to 10 thereof, a new and improved RV water filter apparatus embodying the principles and concepts of the present invention and generally designated by the reference numeral 10 will be described.

More specifically, the RV water filter apparatus 10 of the instant invention essentially comprises first fluid supply conduit 11 mounted to a filter canister 12, with a second fluid supply conduit 14 directed from the filter canister to an RV fill nozzle 14 directed into the associated recreational vehicle housing, or alternatively into a recreational vehicle coupling 15 directed into the conventional plumbing within a recreational vehicle.

A flange plate 16 of planar construction defined by a predetermined width is provided having a plurality of flange plate apertures 19 directed therethrough adjacent a forward end of the flange plate receiving flange plate fasteners 17 through the flange plate apertures 19, with the fasteners 17 received within the canister head 18 of the filter canister 12. In this manner, the flange plate 16 is orthogonally oriented relative to an axis 12a of the filter canister 12. A unitary mounting flange 20 is provided having spaced parallel and coplanar mounting plate flanges 21, each having mounting plate flange apertures 22 directed through each of the mounting plate flanges 21. Mounting plate fasteners 23 are directed through the mounting plate flanges 21 into a vehicular bottom wall 25 of the recreational vehicle in adjacency relative to the recreational vehicle fill nozzle 14 and the coupling 15. A connecting flange 24 is oriented parallel to and below the mounting plate flanges 21 to receive the flange plate 16 in a sliding relationship over the connecting flange 24 between the mounting plate flanges 21. In this manner, ease of assembly and disassembly of the organization is afforded, whereupon transport of the recreational vehicle, the flange plate 16 is merely removed relative to the mounting plate in association with the decoupling of the fluid supply conduits 11 and 13.

Figure 8:
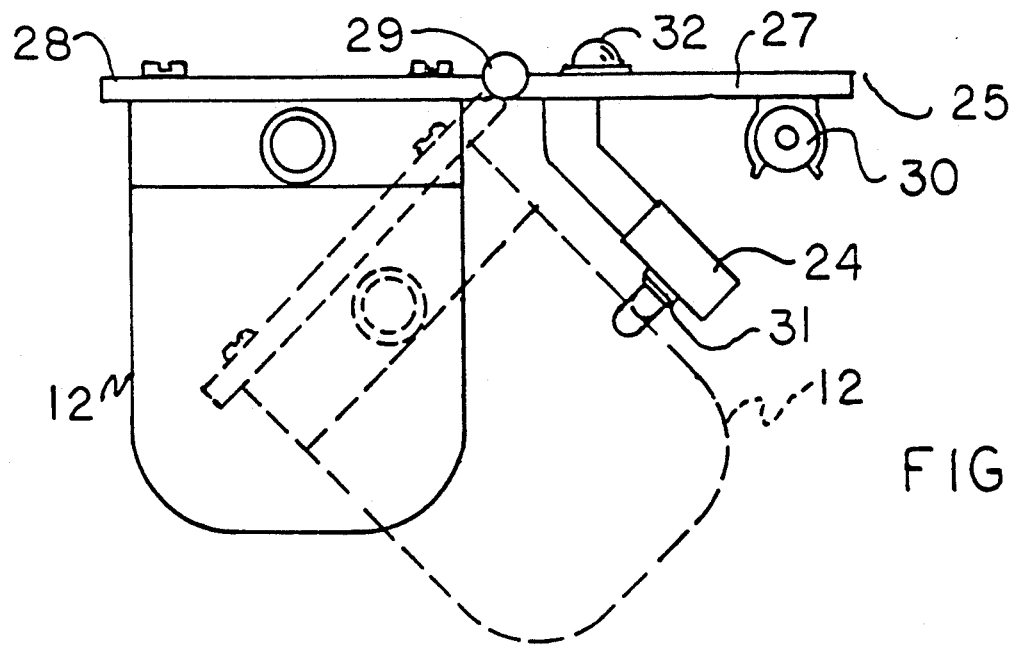
FIG. 8 is an orthographic side view of a modified aspect of the invention utilizing indicator means.
Figure 10:
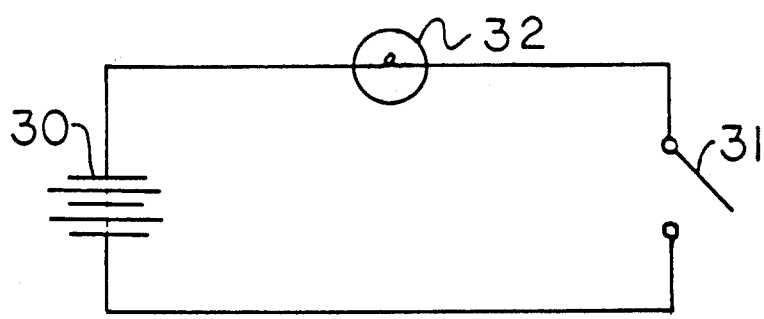
FIG. 10 is a diagrammatic illustration of the electrical circuitry utilized by the modified aspect of the invention, as illustrated in FIG. 8.
Figure 9:
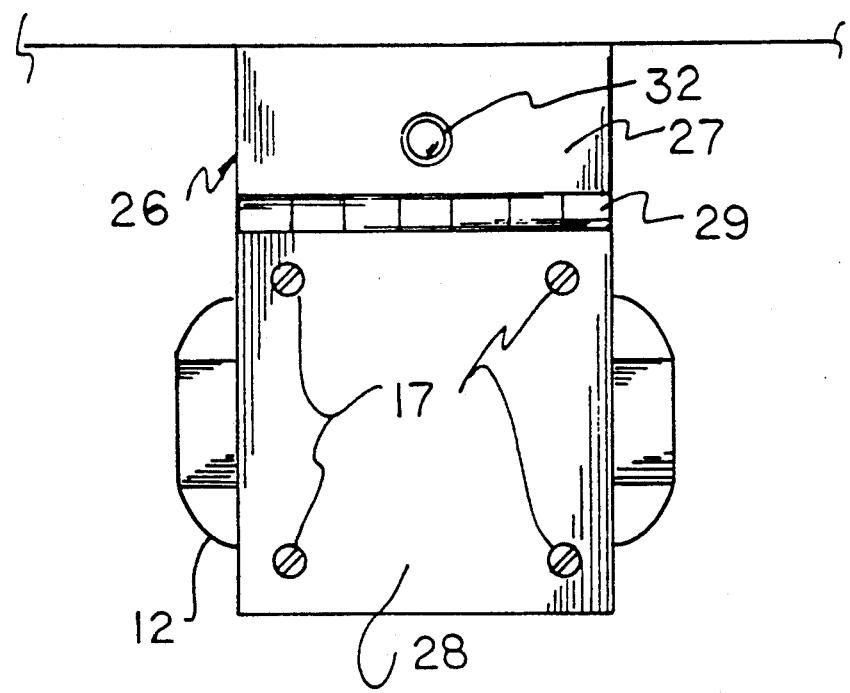
FIG. 9 is an orthographic top view of the modified water filter structure.

The FIGS. 8-10 illustrate the use of a modified flange plate 26 having a rear flange plate 27 defined by the predetermined width slidably received onto the connecting flange 24 of said predetermined width. A forward flange plate 26 is attached to the rear flange plate 27 by a spring hinge 29, wherein normally the rear flange plate and the forward flange plate are maintained in a coplanar relationship about the spring hinge 29 when the filter canister and associated hoses are mounted to the flange plate. A battery 30 is secured to a bottom surface of the connecting flange 24 in electrical communication with a switch 31 positioned at a forward end of the connecting web in adjacency to the spring hinge positioned therebelow. The battery and switch 31 are in electrical communication with an illumination indicator bulb 32 mounted to a top surface of the rear flange plate 27 in adjacency to the spring hinge 29. In this manner, upon the filter canister 12 filling with sediment and the like, additional weight is sensed by the spring hinge permitting deflection of the canister to the phantom orientation, as illustrated in FIG. 8, whereupon contact with the filter canister forward flange 28 is effected directing closure of the switch 31 and illumination of the bulb 32 for indication of a filter canister that needs replacement.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An RV fluid filter apparatus in combination with a recreational vehicle, with the recreational vehicle having a side wall and a bottom wall, the side wall including a fluid coupling, wherein the apparatus further comprises, a first fluid supply conduit, and a filter canister, with the first fluid conduit having a first end secured to the filter canister, and a second fluid supply conduit, wherein the second fluid supply conduit includes a second conduit first end, and the second conduit first end secured to the filter canister, and the second supply conduit having a second supply conduit second end, and the second supply conduit second end secured to the fluid coupling, and a flange plate, the flange plate defined by a predetermined width having a flange plate first end and a flange second end, and the flange plate including a plurality of flange plate apertures directed through the flange plate adjacent the first end, and a plurality of flange plate fasteners directed through the flange plate apertures and the flange plate fasteners received within the canister, and the canister having a canister axis and the flange plate orthogonally oriented relative to the canister axis, and a unitary mounting plate, the unitary mounting plate including mounting plate spaced, parallel, and coplanar mounting plate flanges, said mounting plate further including a mounting plate connecting flange connected to each of said spaced mounting plate flanges and oriented below and parallel to the spaced mounting plate flanges, and a plurality of mounting plate apertures directed through each of the mounting plate flanges, and a plurality of mounting plate fasteners directed through the mounting plate apertures and received within the recreational vehicle bottom wall, and the connecting flange defined by a connecting flange width equal to the predetermined width, and the flange plate second end slidably received over the connecting flange between the mounting plate flanges and below the recreational vehicle bottom wall.

2. An apparatus as set forth in claim 1 wherein the flange plate includes a spring hinge intermediate the flange plate apertures and the flange plate second end, and a battery mounted to the connecting flange, and an illumination indicator bulb mounted to the flange plate adjacent the flange plate apertures, and a switch mounted to the connecting web in adjacency to the spring hinge, whereupon deflection of the canister effects communication with the switch to effect closure of the switch and illumination of the illumination indicator bulb.

* * * * *